Dec. 5, 1933.                A. E. NIBLER                1,938,111
                       HYDRAULIC CLUTCH MECHANISM
                         Filed Nov. 3, 1930            4 Sheets-Sheet 1
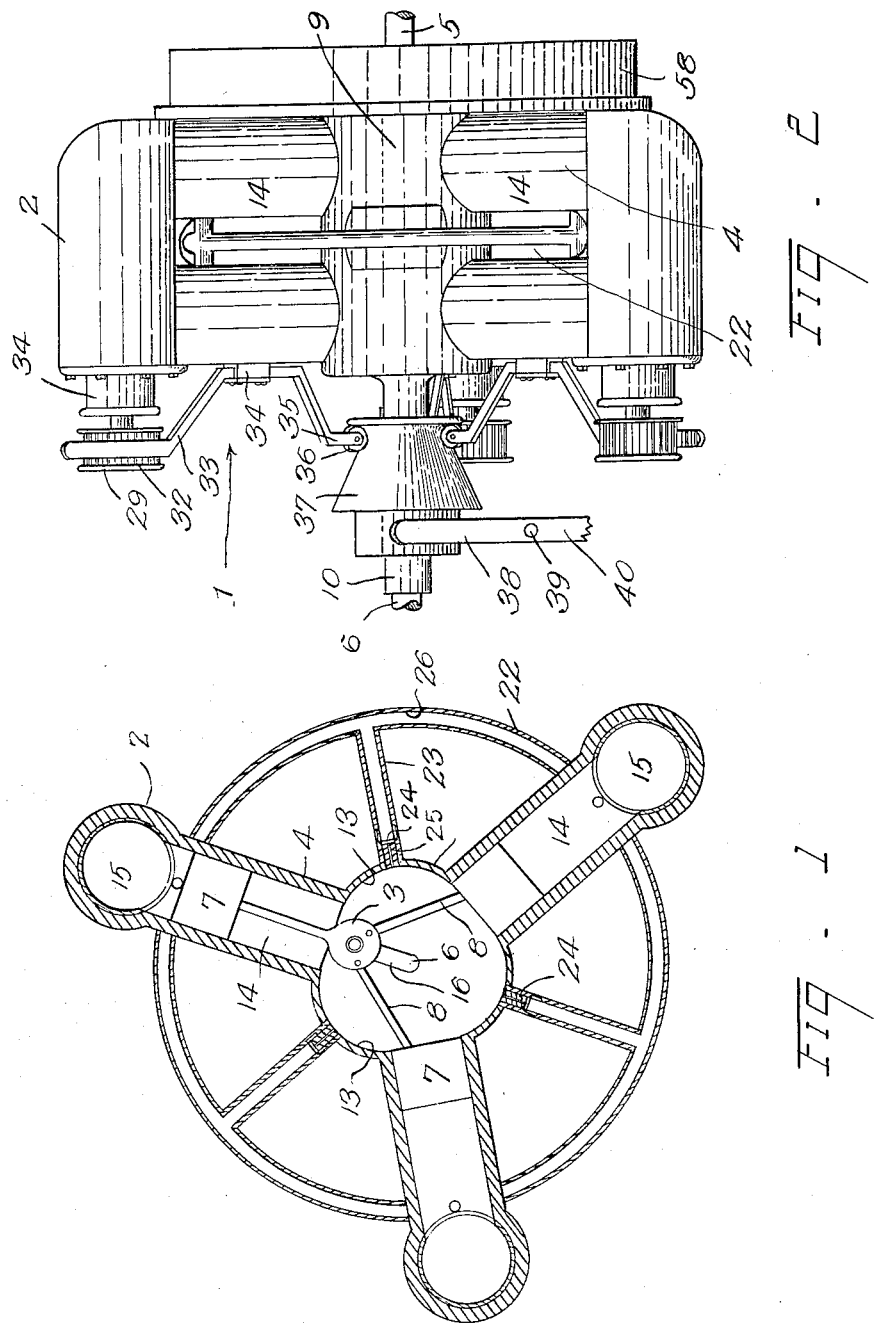
INVENTOR
*Arthur E. Nibler*
BY
*E. E. Sauze* ATTORNEY Dec. 5, 1933.  A. E. NIBLER  1,938,111
HYDRAULIC CLUTCH MECHANISM
Filed Nov. 3, 1930   4 Sheets-Sheet 2
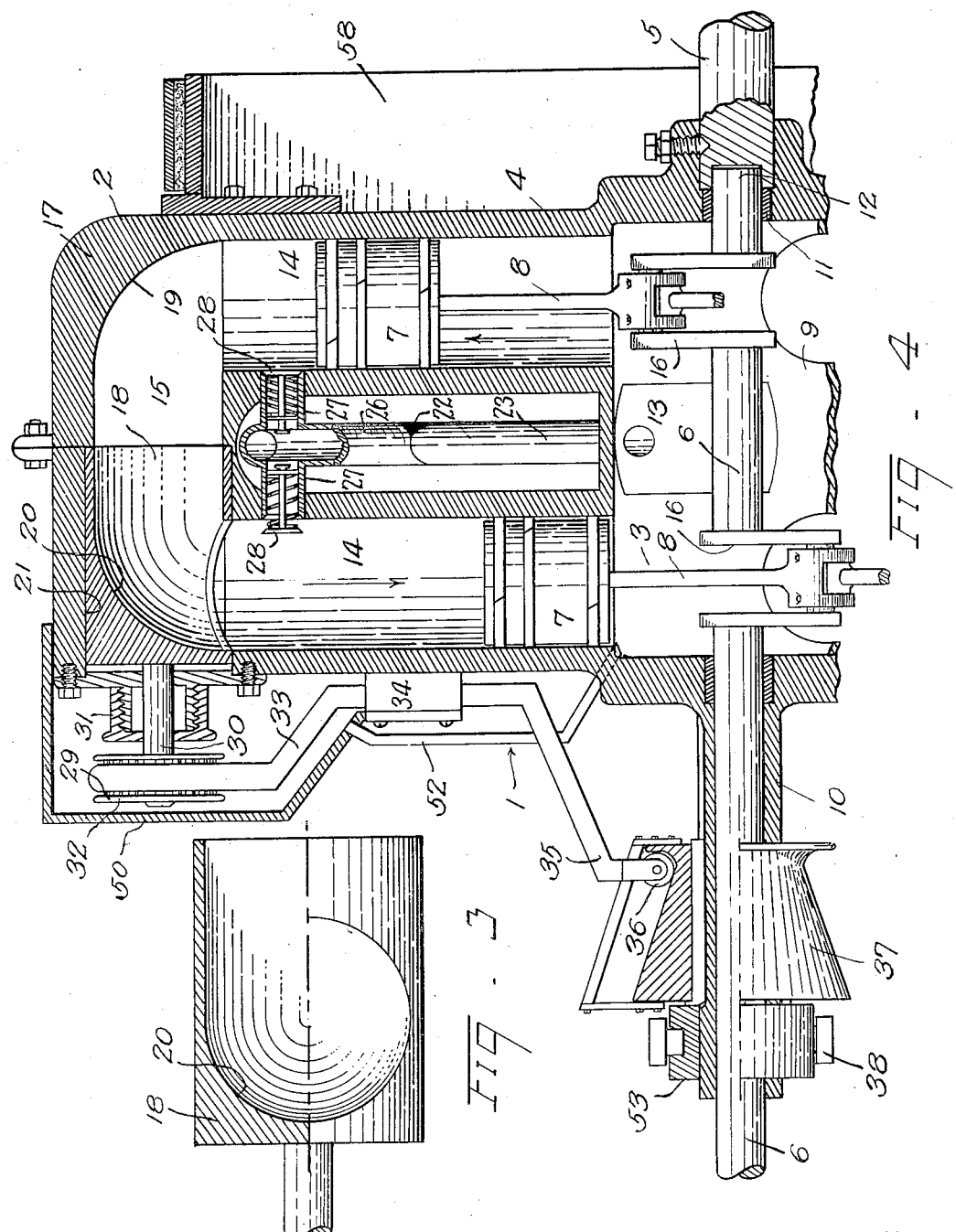
INVENTOR
BY *Arthur E. Nibler*
ATTORNEY Dec. 5, 1933.  A. E. NIBLER  1,938,111
HYDRAULIC CLUTCH MECHANISM
Filed Nov. 3, 1930  4 Sheets-Sheet 4
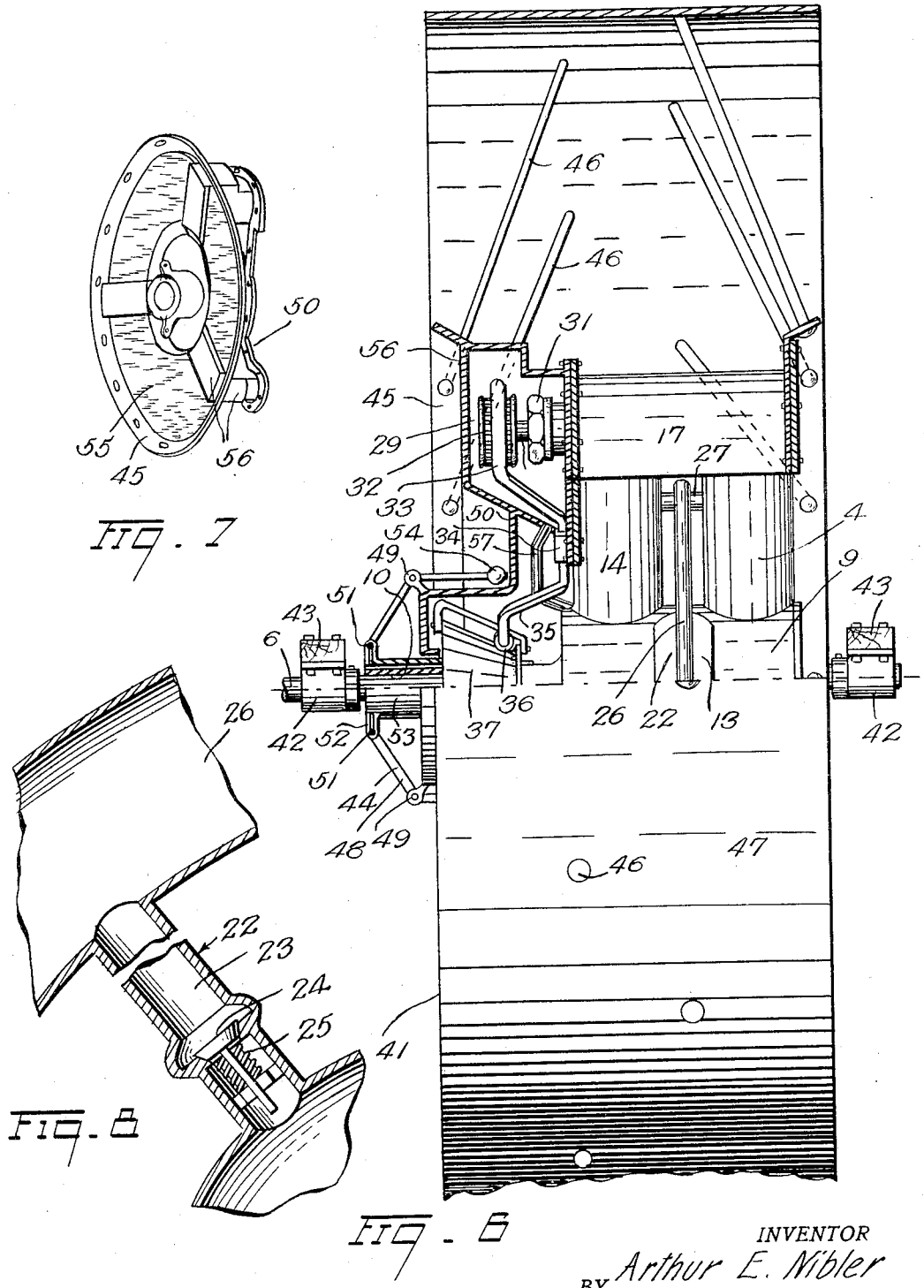
INVENTOR
Arthur E. Nibler
BY
ATTORNEY

UNITED STATES PATENT OFFICE 1,938,111

HYDRAULIC CLUTCH MECHANISM

Arthur E. Nibler, Walla Walla, Wash.

Application November 3, 1930. Serial No. 492,891

2 Claims. (Cl. 192—60)

This invention relates to hydraulic clutch mechanisms and has as one of its objects to provide a hydraulic clutch that is adapted to construction in various sizes for universal application.

Another object of the invention is to provide a hydraulic clutch mechanism that is adapted to rotate and that will utilize the centrifugal force, generated by its rotation, in its operation.

A further object of the invention is to provide a hydraulic clutch mechanism depending upon a lubricant for its successful operation and reducing friction to a minimum thereby.

A further object of the invention is to provide a hydraulic mechanism that is attached rigidly to a propelling means and that may be utilized as a brake therefor.

A further object of the invention is to provide a hydraulic mechanism that will provide a governor operated brake and that may be built in the hub of a wheel.

With these and other objects in view reference is now had to the accompanying drawings in which Fig. 1 is a semi diagrammatic view in vertical cross section taken through one of each pair of cylinders;

Fig. 2 is a side elevation of the device with oil retainers removed;

Fig. 3 is a plan view, partly in section, of a form of controlling valve;

Fig. 4 is a sectional elevation of one pair of cylinders.

Fig. 6 is a front elevation of a wheel with part broken away to show the application of the mechanism as a brake for a wheel;

Fig. 7 is a perspective view of one form of oil tight cover; and

Fig. 8 is an enlarged detail view of the valve and spring assembly.

Figure 5:
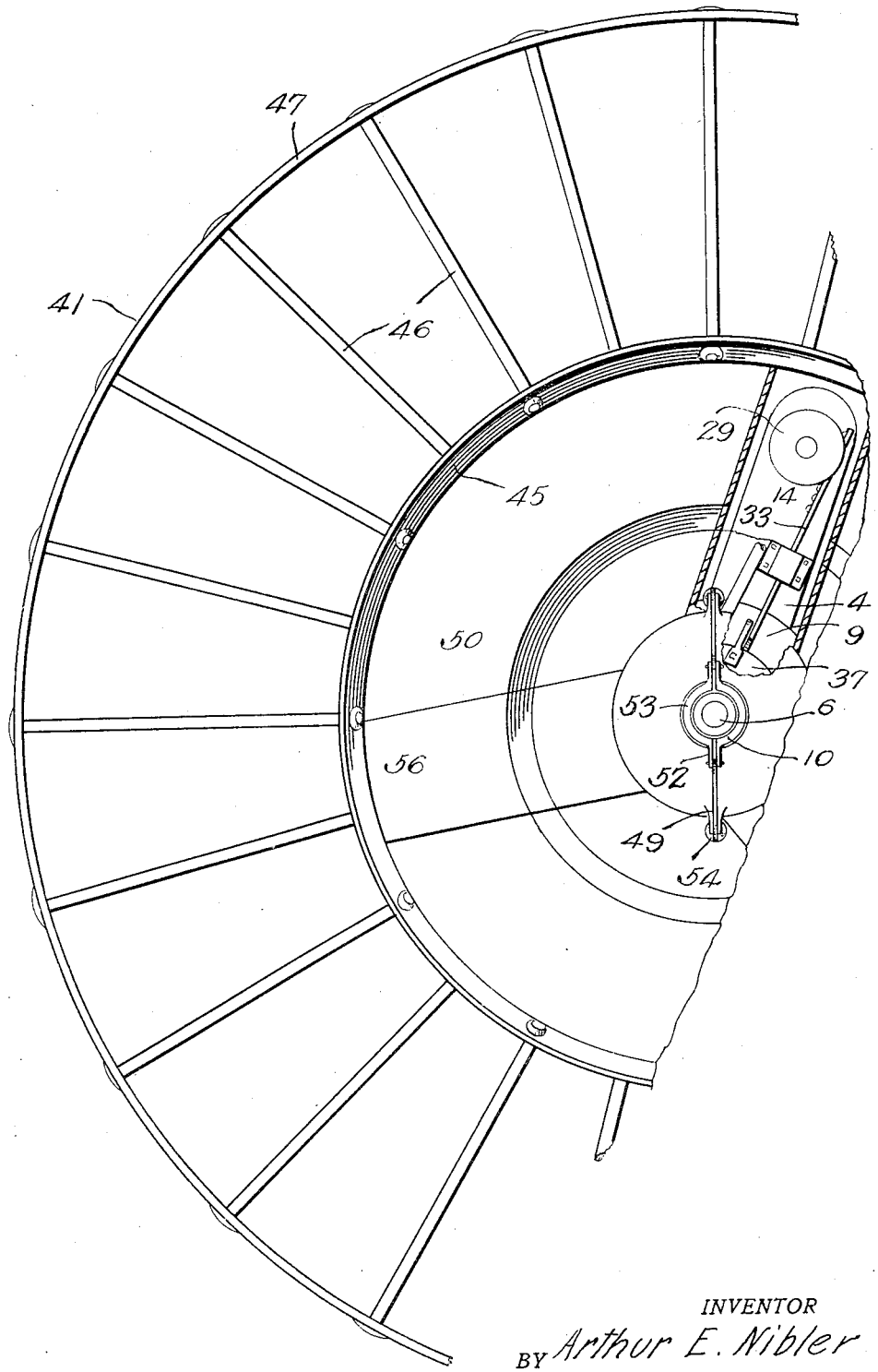
Fig. 5 is a side elevation of a section of a wheel showing the oil tight cover partly in section to disclose one of the cylinders.

Having reference to the drawings like numerals refer to like parts throughout the several views and the numeral 1 refers to the clutch mechanism as a whole, which mechanism consists in general of a driven part 2 and a driving part 3 the driven part consisting of a cylinder block 4 rigidly secured to a propeller means 5, adapted to drive any specified machinery, and the driving part consisting of a crank shaft 6 driven directly or indirectly by any prime mover (not shown) and including the pistons 7 and connecting rods 8, all as shown in Figs. 1 and 4.

Specifically the driven part consists of a crank case 9 which is of a generally cylindrical form for mounting on and in concentric relation with the said crank shaft 6, for rotation thereon, and rotatable with said propeller shaft 5, to which it is rigidly secured in any suitable manner, or as shown in Fig. 4.

The crank case 9 forms a fluid reservoir, for a purpose to be explained, and may be extended at one end thereof to provide a bearing 10 in which the said crank shaft is journaled, while its opposite end is adapted to provide a bearing 11 for the free end 12 of the crank shaft by this free end forming a union with the said propeller shaft, in turn supported by the crank case, in the general manner shown in Fig. 4, whereby to maintain the alignment of all parts concerned.

The crank case 9 may be further provided with indentures 13 as shown in Fig. 1, wherein, and as a fluid reservoir adapted for rapid rotation, it will provide pockets in which the fluid content of the reservoir will be deposited by the centrifugal force due to said rotation.

Attached to or formed integral with the said crank case 9 are the said cylinder blocks 4 spaced circumferentially at equal distances apart to provide with said crank case a balanced driven part and these cylinder blocks may form three assembled units as shown or obviously any number of units may be utilized as desired or required, according to the space provided by said crank case, and the work required, and each unit will consist of pairs of cylinders 14 longitudinally disposed in series on said crank case, with each cylinder of the series positioned in operable relation with its respective crank of the crank shaft 6.

The cylinders 14 are radially disposed and by placing them side by side as above mentioned are parallelly arranged in the series and while the cylinder blocks are of a general form and shape of an internal combustion engine they differ from the said engine by the fact that their cylinders are provided with an intercommunicating passageway 15 extended between and communicating with each cylinder of the pair, the purpose of which passageway will be subsequently explained.

Mounted within the said cylinders 14 are the pistons of the usual type, and provided with the usual connecting rods 8, and these rods are arranged so that all pistons in a generally circumferential line may be attached to a single crank 16 of the said crank shaft to provide alternate movement of the pistons in their respective cylinders, and the cranks of said crank shaft are oppositely positioned in the usual manner so that the pistons of each pair will have like distance of travel but with directly opposite movement.

Where it is desired a cylinder head 17 may be attached to or, as shown in the drawings, may be formed integral with each pair of cylinders, and in this case the intercommunicating passageway 15 is preferably formed in the said head, whereby upon assembly the cylinders will be continued through the said passageway to join or connect said cylinders.

By this connection of the pistons with the crank shaft it is obvious that the pistons in series will operate alternately with a reciprocatory movement in said cylinders, and as the mechanism is intended for rotative movement a connecting means must be established between the reciprocating pistons and the rotating cylinders and this connecting means consists of a fluid, preferably oil, to be centrifugally and constantly established in this passageway, and between the said cylinders and their pistons, to provide a continuity between said pairs of cylinders and said pairs of pistons. And to controllably cause the rotation of said mechanism by the reciprocating action of the cranks of the crank shaft a main control valve 18 is provided which main valve is rockably disposed in the communicating passageway.

This main valve is preferably of cylindrical form and hollow to provide an unrestricted passageway between the cylinders, and as friction is a vital factor to be overcome it will be noted by reference to Fig. 4 that one bend of the passageway is curved, as at 19, and that the interior of the valve has a like curvature to form the opposite bend 20 whereby to avoid as much friction as possible, and for the same reason the said passageway will be of greater cross sectional area than that of the said cylinders to afford a reduction of velocity and its consequent friction.

As it is essential that the fluid contents between the two pistons remain constant during operation and as the logical place to store the fluid is in the crank case 9 means is provided for a constant flow to the cylinders, which means consists of a centrifugal oil feeder 22 as will now be explained.

Secured in the indentures 13 of the reservoir 9 (crank case) and in communication therewith are radially extending oil pipes 23 provided with valves typically shown as at 24, which valves are intended to open outward against a spring 25 designed to seat and close the valve when the device is at rest but not strong enough to overcome the centrifugal force thereon during rotation of the cylinders 4 and these pipes extend outward and form a passageway for the fluid contained in the said reservoir to a curved distribution pipe 26 preferably positioned concentric with the said reservoir, which curved pipe completes the passageway from the said reservoir to a pair of feeders 27 disposed between the pairs of cylinders, and in communication therewith, and in which horizontal valves 28 are provided, as shown in Fig. 4, that open into the respective cylinders 14 whereby to maintain the continuity of the fluid connecting means disposed for movement in the passageway of said mechanism.

By this means the centrifugal force due to the rotation of the device will force the oil from the said reservoir to the said cylinders and passageway to supply any loss that may occur therein from any cause.

As the main valve 18 is constructed with a channel therethrough completing the said passageway between the said cylinders and as this valve is adapted to rock for operation it is obvious that by rocking the valve that the passageway will be fully restricted and closed, this valve therefore becomes a controlling means associated with the cylinder to variably restrict the movement of the fluid connecting means therein, and to operate this valve an operating means 29 is provided which consists of a short shaft 30 rigidly secured to the valve and extended through a packing box 31 and is provided on its outer extended end with a small spur gear 32, and engaging this gear is a rack arm 33 extended toward the center of the machine and through a guide 34 intended to maintain the rack of the arm in engagement with said gear 32, and the inner or centrally disposed end 35 of this member is provided with a roller 36 adapted to register with a sliding cone shaped cam 37 whereby, upon the horizontal movement of this cam upon the extended bearing 10 of the crank case, the roller will be raised or lowered as the cam is forced inward or outward respectively which movement will cause a partial and selective rotation of the said gear 32, and with it said valve 18, and the cam may be operated by a yoke 38, pivoted as shown at 39 in Fig. 2, and extended to provide a lever handle 40 shown broken in this Fig. 2.

Where the mechanism is used for braking purposes it may be incorporated with other propelling means such as a wheel 41, Figs. 5 to 7 inclusive, the bearings of the crank shaft providing the hub and the crank shaft functioning to provide the axle.

The axle will be fixed in supporting bearings 42, suitably secured as to a frame 43, and the wheel mounted thereon, as, say, where the wheel is to be used as a vehicle wheel and where it is desired to prevent rotation beyond a certain predetermined velocity.

In this case a simple governor 44 is provided instead of the yoke 38 wherewith to operate the cam 37, and with the governor set for the speed desired the cam will be moved as with the yoke, and the valve will be rocked, when the movement of the connecting fluid will be restricted, this in turn braking the wheel against increased velocity.

Obviously the yoke 38 may be added for use in conjunction with the governor should it be desirable to bring the wheel to a complete stop.

To incorporate the device as a wheel, as shown in Fig. 6, flanges 45 may be provided for rigid securement to the cylinders, and spokes 46 rigidly secured therein will connect with the tire 47 of the wheel, in the usual manner of such construction.

The governor 44 is typically represented by a bent arm 48 fulcrumed at 49 on an oil tight cover 50, to be explained, one end of the lever being provided with a pin 51 adapted for sliding engagement with a U shaped member 52 attached to the cam sleeve 53, with the opposite end provided with an adjacent mounted ball 54.

By setting the ball properly on the arm the weight will attempt to move outward by the centrifugal force of the rotating device and this movement will slide the said sleeve 53 and cam for the operating of the valve, as above described.

As a precautionary measure against leakage through the said packing box 31 an oil tight cover 50 is provided which is extended to the said guide 34, and this cover is secured to the cylinders and the guide with a suitable oil tight joint for the purpose.

Where the mechanism is designed for use within a wheel 41 the oil tight cover may consist of a disc 55 terminating in the flange 45 to accommodate the spokes 46, as shown in Fig. 6, and may include the covers 56 for the several cylinders, terminating at the guides, and the disc may be utilized to exclude all dust by fitting close around the said sleeve 53, shown assembled therewith in this figure and in Figure 7.

Should there be a tendency for excessive leakage to occur a drain pipe 57 is provided at the inner end of said cover, and preferably adjacent to said guide 34, which drain pipe is adapted to lead into the shell of said crank case to return said oil or fluid thereinto and provide a release for the excess oil from said cover.

By attaching a brake 58 to the device, as shown in Figs. 2 and 4, means is provided whereby to control the rotation of the said mechanism and with it the propeller shaft 5, whereby to control the propeller shaft when the prime mover is not in operation, or, when the prime mover is in operation with the main valve in its wide open or in the partly open or unrestricted position, or the brake will obviously brake the prime mover when the valve is closed to a selected degree.

It is now plainly evident that with the valve open the prime mover will be free to start without a load as the fluid connecting means between pistons will be reciprocated by and with the pistons, and through the said passageways. While there will be a certain amount of inherent frictional resistance offered by the propeller shaft the resistance thereof will normally overcome the effect of this reciprocation and prevent rotation of the mechanism by that friction. In case however, as for instance in an automobile standing on a downhill slope, where it is inclined to move by gravity effect, upon applying the brake the mechanism will be maintained in a fixed position and the friction above mentioned will provide only a slight effect upon the crank shaft and prime mover at the moment of starting.

In operation there must be considered two moving parts, the driven part and the driving part, the driven part having a rotating movement and the driving part a reciprocating movement, which parts are directly connected together for their respective movements by the fluid connecting means which acts as follows:

Whether the crank shaft is rotated with the mechanism stationary, or whether the crank shaft is stationary and the mechanism is rotated, there will be a reciprocatory movement of the fluid in the passageway, conversely if the mechanism rotates with a velocity equalling that of the crank shaft there will be no reciprocatory movement of the pistons in the cylinders and consequently no reciprocatory movement of the fluid.

From the above it is plainly evident that by controlling the movement of the fluid in the passageway the relative movement of the driven and driving parts may be controlled, and further that by controlling the movement of the fluid the reciprocating movement of the pistons will be converted to a rotating movement of the mechanism.

It is also plainly evident that if the controlling means is operated to any selected position the rate of difference of velocity will be in proportion thereto and with this in mind it is now obvious that the movement of the device may be variable and selective according to the manipulation of the valve.

It is further evident that by applying the brake or, by other means of preventing the rotation of the cylinders, that the prime mover may be idled at high speed; that with the prime mover operating at high speed a gradual releasing of the brake and closing of the main valve will provide the equivalent of gear reduction whereby the driven mechanism (as in automobiles) will be started gradually but with the maximum power of the said prime mover; that under these conditions or under conditions of a like nature, as where used on track laying tractors, where two of the clutches are used, they may be permitted to "slip" for an indefinite period of time without material wearing effect or overheating, as during this operation there are no wearing parts in operation, and as the velocity of the fluid decreases in the enlarged passageway reducing excessive friction, the fluid connecting means functioning to this effect without friction other than that inherent friction mentioned, thus forming a differential.

Having thus described my invention, I claim:

1. In a hydraulic clutch mechanism, the combination with cylinders attached to and rotatable with a crank case, of a fluid distributing and controlling means consisting of an intercommunicating passage way established between said cylinders and provided with a controlling means of greater cross sectional area than said cylinders to afford a reduction of friction therein, radially disposed oil pipes attached to said crank case, a centrifugally operable valve mounted in each of said oil pipes, a curved distributor pipe, attached to and forming a continuation of said oil pipes and provided with feeders connecting with said cylinders, adjacent said passage way, and discharge valves disposed between said distributor pipe and said cylinders, in said feeders.

2. In a hydraulic clutch mechanism, the combination with cylinders attached to and rotatable with an oil tight crank case, of a fluid distributing and controlling means consisting of an intercommunicating passage way established between said cylinders and provided with a controlling valve of greater cross sectional area than said cylinders to afford a reduction of velocity and its consequent friction therein, indentures formed in said crank case, radially disposed oil pipes attached to said indentures, a centrifugally operable valve mounted in each of said oil pipes, a curved distributor pipe attached to and forming a continuation of said oil pipes, and provided with feeders connecting with said cylinders adjacent, and in communication with said passage way, and discharge valves disposed within said feeders, and between said distributor pipe and said cylinders.

ARTHUR E. NIBLER.